(12) United States Patent  (10) Patent No.: US 8,401,693 B2
Baumann  (45) Date of Patent: Mar. 19, 2013

(54) METHOD AND MANIPULATOR GRIPPER FOR SPACING BUNDLES OF A BUNDLE LAYER

(75) Inventor: Michael Baumann, Unterfoehring (DE)

(73) Assignee: Kuka Roboter GmbH, Augsburg (DE)

( * ) Notice: Subject to any disclaimer, the term of this patent is extended or adjusted under 35 U.S.C. 154(b) by 486 days.

(21) Appl. No.: 12/715,514

(22) Filed: Mar. 2, 2010

(65) Prior Publication Data

US 2010/0249984 A1    Sep. 30, 2010

(30) Foreign Application Priority Data

Mar. 2, 2009    (DE) .................. 10 2009 011 299

(51) Int. Cl.
*G06F 7/00* (2006.01)
*G06F 19/00* (2006.01)
*B65G 57/22* (2006.01)
*B65G 61/00* (2006.01)

(52) U.S. Cl. ........ 700/217; 700/230; 700/213; 700/245; 414/796.2; 414/801

(58) Field of Classification Search .................. None
See application file for complete search history.

(56) References Cited

U.S. PATENT DOCUMENTS

2009/0148266 A1 *   6/2009   Baumann et al. .......... 414/796.2

* cited by examiner

*Primary Examiner* — Gene Crawford
*Assistant Examiner* — Yolanda Jones
(74) *Attorney, Agent, or Firm* — Schiff Hardin LLP

(57) ABSTRACT

In a method for spacing bundles of a bundle layer by means of a manipulator gripper with at least one support base that engages bundles and a stop for the placement of bundles, separation between an edge of the support base and the stop is reduced, by a placement motion of the support base in a placement direction that is superimposed on the relative motion of the support base and the stop and is synchronized with this relative motion.

16 Claims, 3 Drawing Sheets

METHOD AND MANIPULATOR GRIPPER FOR SPACING BUNDLES OF A BUNDLE LAYER

BACKGROUND OF THE INVENTION

1. Field of the Invention

The present invention concerns the spacing of bundles of a bundle layer by means of an automated manipulator, in particular a robot.

2. Description of the Prior Art

In many fields, one or more layers of goods bundles—that, for example, can be bound in containers or by packing means or packing aids (such as films)—and/or individual goods are stacked on conveyors (for example belt, chain or rolling conveyors, as well as conveyor means, in particular pallets, table shelves or the like) and therefore assembled for transport, storage or sale. Individual goods and goods bundles are uniformly designated as bundles in the following.

Particularly in the logistics chain of such bundles, individual bundles or bundle rows of multiple adjoining bundles that initially are situated in multiple lines at a stop should be spaced apart from one another, for example in order to be able to better pick up the individual bundles (bundle rows) via simple robot grippers or better detect their position via sensors.

The present invention proceeds from WO 2007/131668 A1. From this document a manipulator gripper is known for depalletizing stacked bundles, which manipulator gripper has two displaceable support bases that move under (underpin) a layer in a closing movement and lift the layer with a positive (friction) fit with rollers that are rotated by motors on the facing sides of the support base that face towards one another. By closing a movable clamp stop in the closing direction, the layer can be braced against a fixed counter-stop after being underpinned on the support bases that have been pushed together. A spaced placement of bundles is not achievable according to WO 2007/131668 A1.

SUMMARY OF THE INVENTION

An object of the present invention is to space bundles of a bundle layer by means of a manipulator gripper.

The method according to the invention is based on a manipulator gripper with one or more support bases that can be respectively moved in a placement direction, on which support bases bundles of a bundle layer can be engaged (in particular put down or deposited), for example by suction, lateral insertion, or unrolling. The bundle layer exhibits two or more bundle lines in the placement direction. Each bundle line includes a bundle or a bundle row, and is placed at a distance from another bundle line in the placement direction.

To space apart bundle lines, the support base or bases are moved in the respective placement direction in a placement motion. The support bases are thereby advantageously shifted (displaced) linearly, in particular essentially horizontally. However, other placement motions are also possible, for example a pivoting apart of the support bases or the like. If the manipulator gripper possesses two or more support bases that can be moved against on another, these are preferably moved in opposite placement directions.

The support base or support bases advantageously move relative to a tool flange with which the manipulator gripper is attached to a manipulator, for example an articulated arm robot or portal robot. Additionally or alternatively, a movement of the support base or support bases can ensue by a movement of the entire gripper by the manipulator in the respective placement direction. The placement motion of a support base always ensues relative to the placement surface on which the bundle line should be deposited (for example a conveyor) given a gripper at rest relative to this (and thus also relative to the tool flange). A movement in the sense of the present invention can also include a temporary standstill within an overall movement workflow over time.

A stop is associated with at least one (advantageously every) movable support base. To set down bundle lines, the distance between an edge of the support base and the stop is reduced by a relative movement between the support base and stop, such that the bundle line nearest the edge is pushed over the edge by the stop (and possibly additional bundle lines arranged in-between), and thus is deposited.

The relative movement between support base and stop can be achieved by moving the support base in the placement direction while the stop at least temporarily executes no movement, a pushing movement in the placement direction that is smaller than the placement movement of the support base, and/or a movement counter to the placement direction, relative to the placement surface on which the bundle lines should be deposited. For a gripper at rest relative to the placement surface, a pushing movement in the placement direction therefore also always ensues relative to the tool flange.

In that the placement movement of the support base explained in the preceding (with which the bundle lines are shifted relatively to the placement surface, and thus their respective placement positions can be spaced apart from one another) and the relative motion between support base and stop (with which the individual bundle lines are placed) are now superimposed and synchronized with one another, bundle lines can be placed spaced apart from one another in the placement direction.

Without limitation as to generality, this can be explained in a simplified manner in the diagram of FIG. 9. As shown therein, the remaining loading surface l (dependent on the relative motion between support base and stop) between support base edge and stop is plotted to the right over time t and discretized with the different widths of adjacent bundles. At the points in time t1, t2, t3, the loading surface l has respectively been reduced insofar as that a bundle is slid down from the support base and deposited. In the left quadrant, the placement speed x(t) of the support base is plotted over the placement surface, which indicates where the edge of the support base is located at a specific point in time. At the points in time t1, t2, t3, the respective bundle is thus deposited at these points x1, x2, x3 in the placement direction. It can be seen that the spacing of the bundles in the x-direction can be adjusted by synchronizing the relative motion (to the right in FIG. 9) and the placement motion (to the left in FIG. 9). The distances [intervals] of the deposited bundles thus increase given an increase of the placement speed (flatter x(t) curve) and a consistent relative motion. Naturally, other curves can be realized instead of the lines x(t), l(t) that are shown, wherein in particular segments perpendicular to the time axis in which the loading area or edge position are not varied are also possible.

With regard to the structural design of a manipulator gripper particularly suitable for implementing the method according to the invention and the engagement of the bundle layer by unrolling, reference is made to WO 2007/131668 A1, the disclosure of which is incorporated by reference herein. It is particularly advantageous, in the manipulator gripper described in WO 2007/131668 A1, to replace the fixed stop transverse to the placement direction (reference character 13 in the exemplary embodiment) by a movable stop; the gripper is thus fashioned symmetrically in this regard with two movable stops, as is shown in the exemplary embodiment of WO 2007/131668 A1 with reference character 14. In general, the manipulator gripper can possess two or more support bases (advantageously support bases that can respectively be moved against one another in pairs) to engage the bundles, an respectively has a stop that can move in the respective placement direction, wherein the support bases are moved in (in particular opposite) placement directions to deposit bundles, and movements of the stops are synchronized with the movements of the support base.

As used herein, "synchronized movements" means movements matched to one another, or the dependency of the one movement on the other. In particular, drives (actuators) for support bases and stop can be coupled with one another for this, in particular via software or mechanically. For example, the placement movement of a support base can momentarily or always be larger than the pushing movement of the respective stop that is synchronized with it, wherein the ratio of placement motion to pushing motion can be constant or vary. This can in particular be realized in that the placement speed of the support base in the placement direction is momentarily or, respectively, always greater than the pushing speed of the stop in the placement direction.

Particularly to realize larger distances between placement positions of adjacent bundle lines, it can be advantageous for the placement motion of a support base to be momentarily at least equal to the synchronized pushing motion of the respective stop, such that the loading area is not reduced in these time periods. This can be achieved by the placement speed of the support base in the placement direction is momentarily essentially equal to the pushing speed of the stop in the placement direction.

As can be seen from FIG. 9, the motion of a support base and/or a stop upon placement of bundles can temporarily or always ensue essentially continuously, which results in a more uniform, less jerky motion. However, the motion of a support base and/or a stop upon placement of bundles can similarly also temporarily or always ensue in cycles, which in particular also enables large spacings, wherein hybrids with continuous motions per segments are also possible.

As is likewise shown in FIG. 9, the spacing can be predetermined by the placement motion and pushing motion being synchronized depending on a predetermined desired distance between bundles in the placement direction x, a length or width of bundles in the placement direction and/or a motion of the manipulator in the placement direction.

Particularly in order to be able to handle individual bundles or bundle rows with simple grippers, or to detect their the positions with sufficient accuracy, it can be desirable to space not only adjacent bundle rows but also bundles in the row apart from one another. This is possible on the one hand by repeating the method explained in the preceding with a placement direction rotated by 90°. However, it is disadvantageous that every bundle row must then be gripped individually. Therefore, one or more bundle rows that have been spaced from other bundle rows in the placement direction x are advantageously placed on a slower conveyor in a transport direction (in particular essentially at a right angle to the placement direction) and are also spaced apart from one another in the transport direction via a transition to a faster conveyor—a speed jump. In order to space different bundles differently, bundles of different bundle layers can be placed on different conveyors.

DESCRIPTION OF THE PREFERRED EMBODIMENTS

Figure 1:
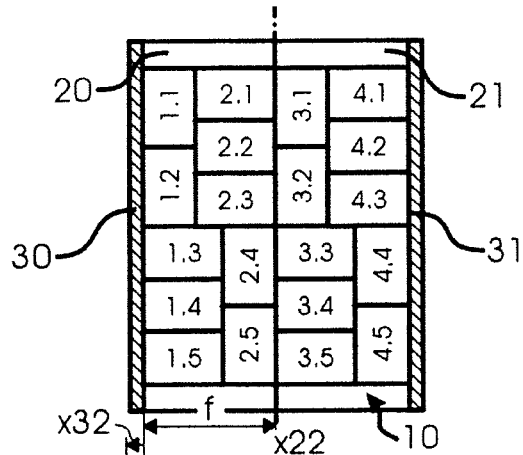
FIG. 1: schematically illustrates a manipulator gripper in plan view in a method step according to an embodiment of the present invention.

FIG. 1 schematically shows a modified gripper based on the gripper as it is described in WO 2007/131668 A1, but with essentially symmetrical support bases 20, 21 and associated, movable stops 30, 31. In FIG. 1 both support bases 20, 21 are pushed together in a placement direction x (from right to left in FIG. 1; see also FIG. 2) and form a closed loading area (surface) that is externally bounded by the stops 30, 31 and on which the bundle layer 10 is accommodated. The different bundles are numbered in matrix notation, wherein the leading character is the bundle line ("1."=left row; "4"=right line), the last character is the position in the line ("0.1"=top; "0.5"=bottom).

Figure 2:
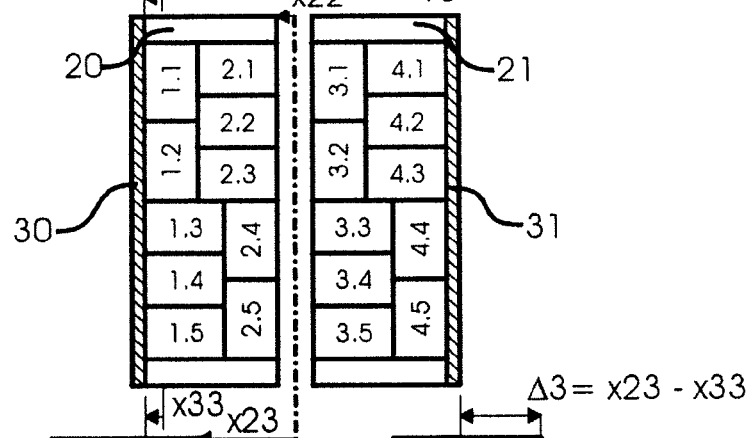
FIGS. 2 through 5 show the gripper according to FIG. 1 in additional method steps.
Figure 3:
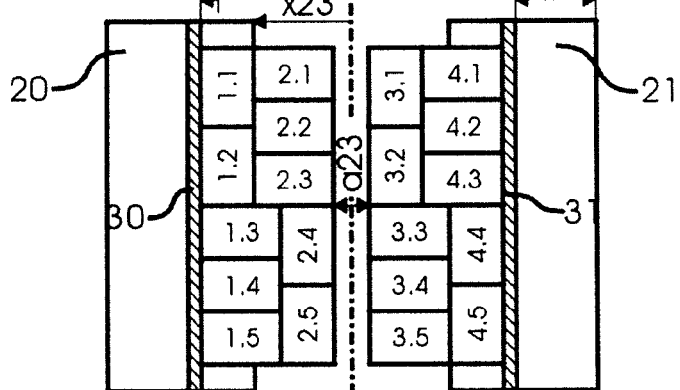
Figure 4:
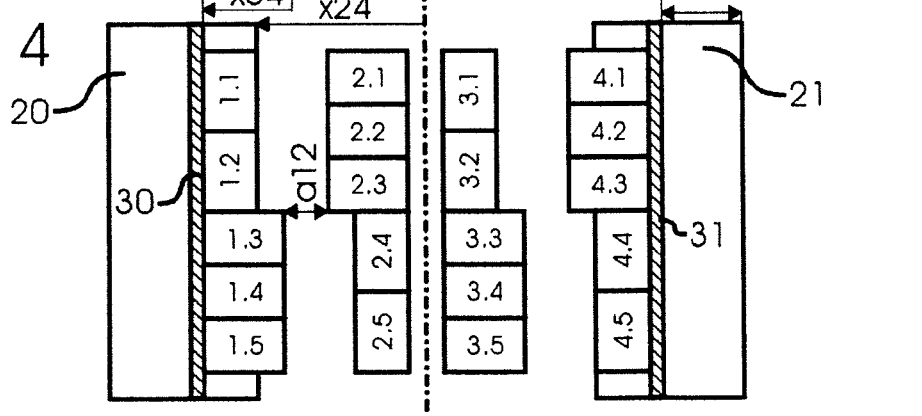
Figure 5:
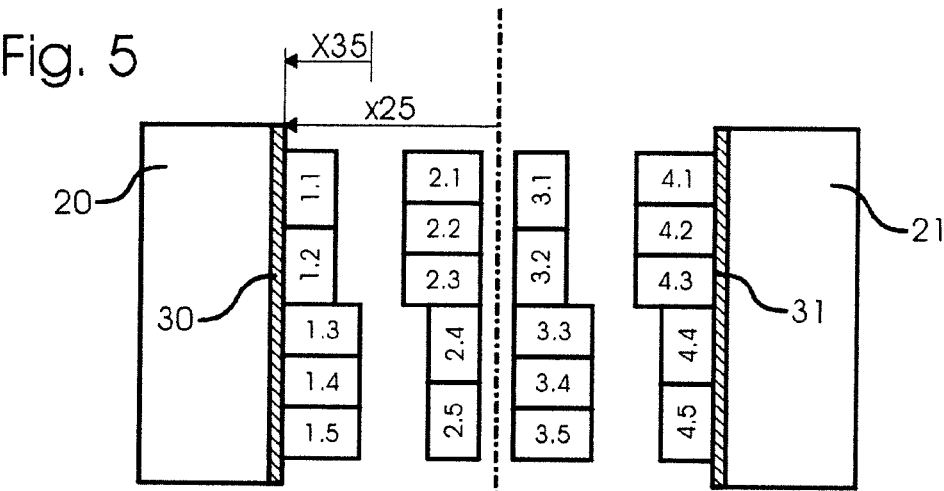
Figure 6:
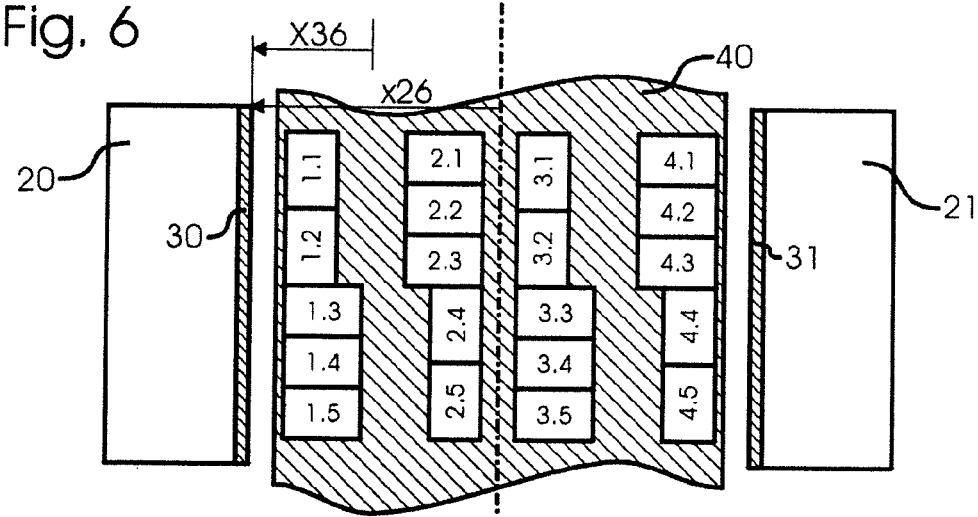
FIG. 6 shows the gripper according to FIG. 1 given placement on a conveyor in a further method step.
Figure 7:
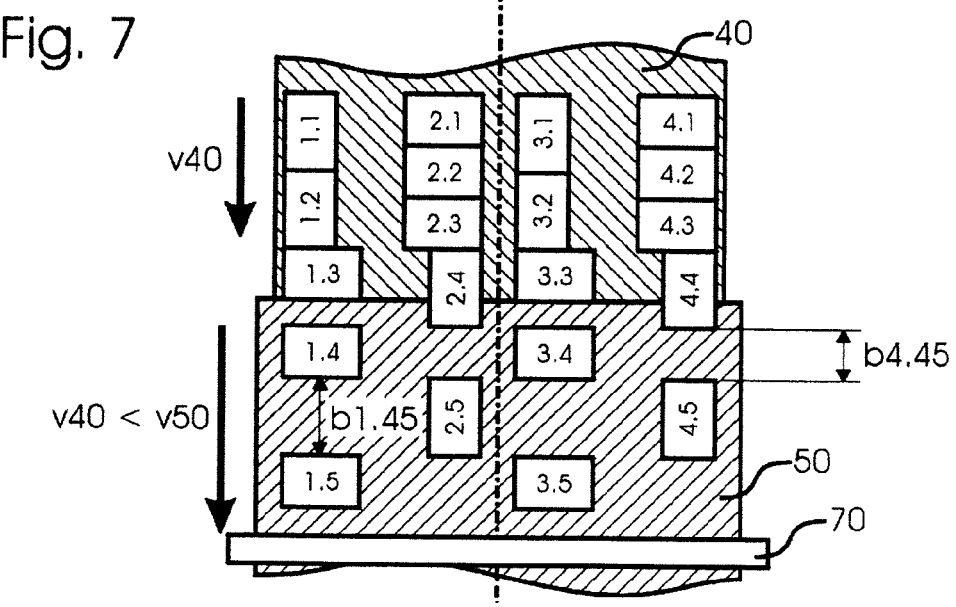
FIG. 7 shows the bundle upon transition to another conveyor in a further method step.
Figure 9:
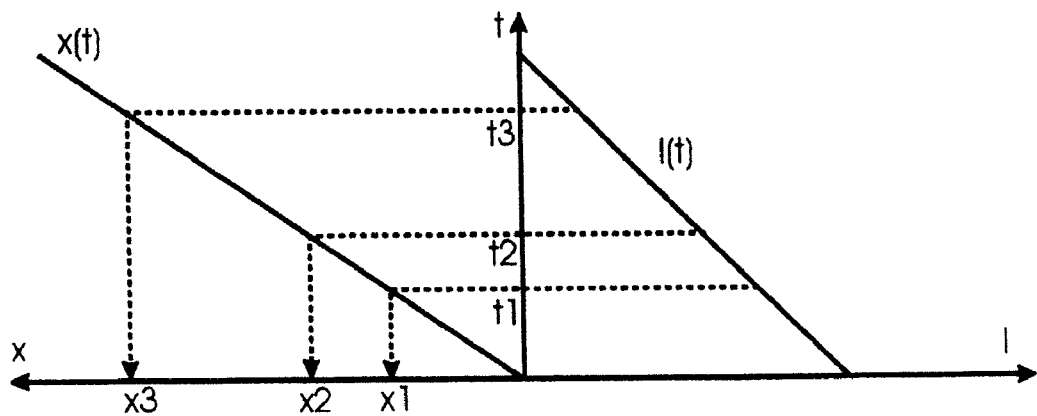
FIG. 9 is a diagram with loading area l and placement motion x over time t.

The spaced placement is subsequently described in discrete steps using the Figure sequence FIG. 1→FIG. 2→FIG. 3→FIG. 4→FIG. 5→FIG. 6→FIG. 7; however, as shown in particular in FIG. 9, it can also be analogously realized by continuous motions x(t) and l(t).

In a first time segment (FIG. 2), the support bases 20, 21 move apart by a respective amount x22. The stops 30, 31 travel essentially identically (or, in every case, sufficiently) by x32≈x22, such that no bundle line is pushed. The quantities "x2, . . .", "x3 . . ." thereby designate the shifts of the edge of the support base 20, 21 or, respectively, the stop 30, 31 from the closed basic position, wherein the end character designates FIG. 2.

In a second time segment (FIG. 3), the support bases 20, 21 are driven apart by a respective x33; however, the stops 30, 31 are furthermore essentially separated by only x32 (or in any case sufficiently little) so that the loading area is reduced by Δ3=x23−x33 and an edge-proximal bundle line 2.1, . . . , 2.5 and 3.1, . . . , 3.5 is pushed from the respective support base. Due to the preceding separation motion in the first time segment (see FIG. 2), these two lines exhibit a distance a23 in the placement direction x.

A third time segment (FIG. 4) essentially corresponds to the first time segment (see FIG. 2), wherein the support bases 20, 21 move further apart without (or in any case with sufficiently little) reduction of the loading area, such that it applies for example that:

$$\Delta 4 = x24 - x34 \approx \Delta 3 = x23 - x33.$$

A fourth time segment (FIG. 5) essentially corresponds to the second time segment (see FIG. 1), wherein the support bases 20, 21 have been displaced by x25>x24, however the stops 30, 31 have furthermore essentially been displaced by only x35≈x34 (or in any case sufficiently little) so that the bundle line 1.1, . . . , 1.5 and 4.1, . . . , 4.5 was pushed from the respective support base. These two lines exhibit a separation [interval] a12 in the placement direction x due to the preceding separation motion in the third time segment (see FIG. 4).

A fifth time segment (FIG. 5) essentially corresponds to the first and third time segment (see FIGS. 2, 4), wherein the support bases 20, 21 move further apart from one another without (or in any case with sufficiently little) reduction of the loading area in order to completely release the bundle lines 1, ..., 4 that are spaced apart from one another, which bundle rows 1, ..., 4 have been deposited on a conveyor belt 40.

In that the bundle lines 1, ..., 4 deposited on the conveyor belt 40 experience a speed jump at the transition to a faster conveyor belt 50, the bundles 1.3, ..., 1.5, 2.4, 2.4, 3.3, ..., 3.5, 4.4 and 4.5 are also spaced apart from one another transversal to the placement direction (from top to bottom in FIG. 7), wherein their interval b1.45, b4.45 can be set by the ratio of the speeds v40, v50 of the conveyors 40, 50 at the transition. The positions of individual bundles can thus be detected accurately by a sensor 70.

Figure 8:
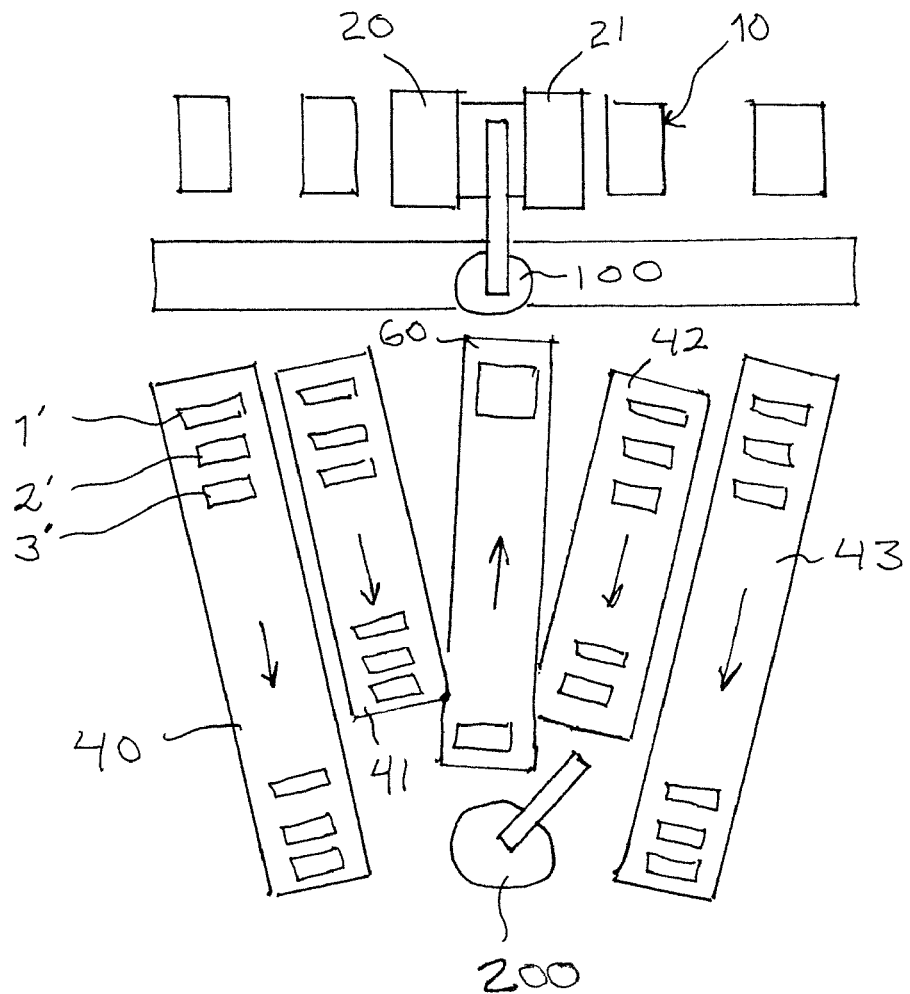
FIG. 8 schematically illustrates a system with a manipulator gripper and different conveyors in a method step according to any embodiment of the present invention.

FIG. 8 shows a more complex application: a manipulator 100 grips various, cyclically supplied, homogeneous bundle layers 10 with the manipulator gripper with its support bases 20, 21 that is explained in the preceding and deposits the bundle layers 10 on different conveyors 40, ..., 43. An additional manipulator 200 grips different bundle rows 1', 2', 3' from the individual conveyors 40, ..., 43 depending on the consignment job and places these on a conveyor 60 on which the rows are collected again by a stop into a compact, now mixed bundle layer and can subsequently be taken up by the manipulator 100 and supplied to the logistics chain.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for operating an automated manipulator gripper, comprising at least one support base that engages bundles, and a stop against which said bundles rest, comprising the steps of:
   engaging bundles with said support base and operating said manipulator gripper to reduce a separation between an edge of the support base and said stop in order to deposit bundles from said support base; and
   operating said manipulator gripper to cause said support base to execute a placement motion for said bundles in a placement direction and moving said stop in a pushing motion in said placement direction synchronized with said placement motion of said support base, thereby producing a relative motion between said support base and said stop, synchronized with said placement motion being superimposed on and with said relative motion.

2. A method as claimed in claim 1 wherein said support base is a first support base and said stop is a first stop, and wherein said manipulator gripper comprises a second support base that also engages said bundles and a second stop against which said bundles rest, and comprising operating said manipulator gripper to move said first and second support bases against each other to engage said bundles and moving the respective first and second stops in said placement direction and moving said first and second support bases in respectively opposite placement directions to deposit said bundles, said movements of said first and second stops being synchronized with said movements of said first and second bases.

3. A method as claimed in claim 2 comprising operating said manipulator gripper to cause the respective placement motions of each of said first and second support bases to be at least momentarily larger than the pushing motion of the respective first or second stop synchronized therewith.

4. A method as claimed in claim 2 comprising operating said manipulator gripper to cause a placement speed of each of said first and second support bases in the respective placement directions to be at least momentarily larger than a placement speed of the respective first or second stop associated therewith.

5. A method as claimed in claim 2 comprising operating said manipulator gripper to cause the respective placement motions of each of said first and second support bases to be at least momentarily equal to the pushing motion of the respective first or second stop synchronized therewith.

6. A method as claimed in claim 2 comprising operating said manipulator gripper to cause a placement speed of each of said first and second support bases in the respective placement directions to be at least momentarily equal to a placement speed of the respective first or second stop associated therewith.

7. A method as claimed in claim 1 comprising operating said manipulator gripper with said placement motion ensuing substantially continuously.

8. A method as claimed in claim 1 comprising operating said manipulator gripper with said placement motion ensuing substantially cyclically.

9. A method as claimed in claim 1 comprising synchronizing said placement motion with said relative motion according to a predetermined ratio between said placement motion and an opening motion of said stop dependent on a factor selected from the group consisting of a predetermined distance between respective bundles and said placement direction, a length of said bundles in said placement direction, and a movement of said manipulator in said placement direction.

10. A method as claimed in claim 1 comprising operating said manipulator to space multiple bundles in bundle rows with said bundle rows being spaced from each other in said placement direction.

11. A method as claimed in claim 10 comprising arranging said bundles to be engaged by said manipulator in bundle rows, each comprised of multiple bundles, with the multiple bundles in each bundle layer being spaced from each other in said placement direction.

12. A method as claimed in claim 11 comprising spacing bundles, in at least one of said bundle rows that has been spaced apart from another of said bundle rows in said placement direction, from each other in a transport direction substantially at a right angle to said placement direction.

13. A method as claimed in claim 12 comprising spacing said bundles apart in said transport direction by conveying said bundles on a first conveyer and transitioning said bundles to a second conveyor that operates at a faster speed than said first conveyor.

14. A method as claimed in claim 12 comprising spacing said bundles apart by conveying respective different bundles on different conveyors.

15. A manipulator gripper system comprising:
   a manipulator gripper comprising a support base configured to engage bundles with said support base, and a stop spaced from said support base;
   a control unit configured to operate said manipulator gripper to reduce a separation between an edge of the support base and said stop in order to deposit bundles from said support base; and
   said control unit being configured to operate said manipulator gripper to cause said support base to execute a placement motion for said bundles in a placement direction and moving said stop in a pushing motion in said placement direction synchronized with said placement motion of said support base, thereby producing a relative motion between said support base and said stop, with said placement motion being superimposed on and synchronized with said relative motion.

16. A non-transitory computer-readable medium encoded with programming instructions, said medium being loaded into a computerized control unit of a manipulator gripper system that operates a manipulator gripper having a support base and a stop spaced from said support base, said programming instructions causing said control unit to:

operate said manipulator to engage bundles with said support base and to then reduce a separation between an edge of the support base and said stop in order to deposit bundles from said support base; and operate said manipulator gripper to cause said support base to execute a placement motion for said bundles in a placement direction and moving said stop in a pushing motion in said placement direction synchronized with said placement motion of said support base, thereby producing a relative motion between said support base and said stop, with said placement motion being superimposed on and synchronized with said relative motion.

* * * * *